(12) United States Patent
Fu et al.

(10) Patent No.: US 11,101,943 B2
(45) Date of Patent: Aug. 24, 2021

(54) METHOD AND APPARATUS FOR TRANSMITTING UCI IN WIRELESS COMMUNICATION SYSTEM

(71) Applicant: Samsung Electronics Co., Ltd., Suwon-si (KR)

(72) Inventors: Jingxing Fu, Beijing (CN); Yingjie Zhang, Beijing (CN); Bin Yu, Beijing (CN); Chen Qian, Beijing (CN); Di Su, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/477,840

(22) PCT Filed: Jan. 12, 2018

(86) PCT No.: PCT/KR2018/000625
§ 371 (c)(1),
(2) Date: Jul. 12, 2019

(87) PCT Pub. No.: WO2018/131937
PCT Pub. Date: Jul. 19, 2018

(65) Prior Publication Data
US 2019/0363842 A1 Nov. 28, 2019

(30) Foreign Application Priority Data

Jan. 13, 2017 (CN) .......................... 201710025986.1
Feb. 17, 2017 (CN) .......................... 201710086169.7
(Continued)

(51) Int. Cl.
*H04L 1/18* (2006.01)
*H04L 1/16* (2006.01)
*H04W 72/04* (2009.01)

(52) U.S. Cl.
CPC .......... *H04L 1/1887* (2013.01); *H04L 1/1671* (2013.01); *H04L 1/1861* (2013.01); *H04L 1/1896* (2013.01); *H04W 72/0406* (2013.01)

(58) Field of Classification Search
None
See application file for complete search history.

(56) References Cited

U.S. PATENT DOCUMENTS 9,397,945 B2 * 7/2016 Han ........................ H04L 47/12
10,263,733 B2 4/2019 Uchino et al.
(Continued)

FOREIGN PATENT DOCUMENTS

EP 3261379 A1 12/2017
WO 2016133106 A1 8/2016

OTHER PUBLICATIONS

Extended European Search Report regarding Application No. 18738576.0, dated Dec. 16, 2019, 10 pages.
(Continued)

*Primary Examiner* — Bunjob Jaroenchonwanit

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure discloses a method of a user equipment (US) for transmitting uplink control information (UCI) in a wireless communication system. The method performed by the user equipment includes: determining a hybrid automatic retransmission request (HARQ) timing or HARQ timings of a dynamically scheduled physical downlink shared channel (PDSCH) and/or a semi-persistent scheduling (SPS) PDSCH and/or a physical downlink control channel (PDCCH) that indicates SPS releasing according to information sent from a base station; and transmitting generated hybrid automatic retransmission request acknowledgement
(Continued)

```
┌─────────────────────────────────────────────────────────┐
│ UE determines a HARQ timing(s) of a dynamically scheduled│
│ PDSCH and/or a SPS PDSCH and/or a PDCCH that indicates SPS│ ~701
│ releasing according to information sent from a base station│
└─────────────────────────────────────────────────────────┘
                            │
                            ▼
┌─────────────────────────────────────────────────────────┐
│ UE transmits generated HARQ-ACK information according to the│ ~702
│             determined HARQ timing(s)                    │
└─────────────────────────────────────────────────────────┘
```

(HARQ-ACK) information according to the HARQ timing or the HARQ timings determined. By applying present disclosure, it is possible to simplify the HARQ-ACK timing determination mode and can perform HARQ-ACK information transmission in time.

10 Claims, 11 Drawing Sheets

(30) Foreign Application Priority Data

| Mar. 23, 2017 | (CN) | 201710179057.6 |
|---|---|---|
| Apr. 20, 2017 | (CN) | 201710261062.1 |
| Sep. 19, 2017 | (CN) | 201710852004.6 |

(56) References Cited

U.S. PATENT DOCUMENTS

| 10,270,580 | B2* | 4/2019 | Ahn | H04L 5/0055 |
|---|---|---|---|---|
| 10,560,955 | B2* | 2/2020 | Shoshan | H04B 7/15542 |
| 10,616,925 | B2* | 4/2020 | Blankenship | H04W 74/0833 |
| 10,667,246 | B2* | 5/2020 | Yamamoto | H04W 72/0446 |
| 2008/0318608 | A1* | 12/2008 | Inoue | H04L 27/2613 455/509 |
| 2012/0320805 | A1 | 12/2012 | Yang et al. | |
| 2014/0023011 | A1* | 1/2014 | Gao | H04L 5/0055 370/329 |
| 2014/0036803 | A1* | 2/2014 | Park | H04L 5/0055 370/329 |
| 2014/0050176 | A1* | 2/2014 | Lin | H04L 1/1861 370/329 |
| 2014/0126491 | A1* | 5/2014 | Ekpenyong | H04L 1/1854 370/329 |
| 2014/0233481 | A1* | 8/2014 | Feng | H04L 5/0053 370/329 |
| 2014/0334419 | A1* | 11/2014 | Yang | H04L 1/1671 370/329 |
| 2014/0348036 | A1* | 11/2014 | Li | H04W 52/48 370/280 |
| 2015/0117271 | A1* | 4/2015 | Liang | H04L 5/001 370/280 |
| 2015/0341923 | A1 | 11/2015 | Yang et al. | |
| 2015/0351116 | A1* | 12/2015 | Shoshan | H04W 72/1226 370/330 |
| 2015/0358924 | A1* | 12/2015 | Papasakellariou | H04W 52/34 370/329 |
| 2016/0174212 | A1* | 6/2016 | Yang | H04L 5/0053 370/330 |
| 2016/0192388 | A1* | 6/2016 | Ekpenyong | H04L 1/1829 370/329 |
| 2016/0242038 | A1* | 8/2016 | Lei | H04L 5/14 |
| 2016/0248553 | A1* | 8/2016 | Shimezawa | H04L 1/1861 |
| 2016/0270033 | A1* | 9/2016 | Yang | H04L 1/1861 |
| 2016/0278124 | A1* | 9/2016 | Zhao | H04W 56/004 |
| 2016/0309461 | A1* | 10/2016 | Yin | H04L 5/0073 |
| 2016/0337086 | A1* | 11/2016 | Shen | H04W 4/70 |
| 2016/0338110 | A1* | 11/2016 | Wang | H04W 74/0833 |
| 2017/0034850 | A1* | 2/2017 | Rico Alvarino | H04W 72/14 |
| 2017/0064696 | A1* | 3/2017 | He | H04L 5/0053 |
| 2017/0150494 | A1* | 5/2017 | Lee | H04L 1/1607 |
| 2017/0230913 | A1* | 8/2017 | Ouchi | H04W 74/0833 |
| 2017/0353946 | A1* | 12/2017 | Rico Alvarino | H04W 76/34 |
| 2018/0123744 | A1* | 5/2018 | Nogami | H04L 1/1854 |
| 2018/0124751 | A1* | 5/2018 | Aiba | H04W 24/10 |
| 2018/0145796 | A1* | 5/2018 | Liang | H04L 1/1861 |
| 2018/0145816 | A1* | 5/2018 | Ahn | H04J 3/1694 |
| 2018/0205513 | A1* | 7/2018 | Yamamoto | H04L 5/0007 |
| 2018/0205525 | A1* | 7/2018 | He | H04L 1/1864 |
| 2018/0219648 | A1* | 8/2018 | Kim | H04L 1/1854 |
| 2018/0242321 | A1* | 8/2018 | Takeda | H04W 72/048 |
| 2018/0343648 | A1* | 11/2018 | Han | H04W 24/10 |
| 2018/0375619 | A1* | 12/2018 | Hwang | H04W 72/0446 |
| 2019/0045552 | A1* | 2/2019 | Blankenship | H04L 1/08 |
| 2019/0132089 | A1* | 5/2019 | Hwang | H04L 1/0007 |
| 2019/0158263 | A1* | 5/2019 | Lee | H04L 5/006 |
| 2019/0215888 | A1* | 7/2019 | Cirik | H04B 7/0695 |
| 2019/0261383 | A1* | 8/2019 | Kwak | H04L 1/1607 |
| 2019/0268103 | A1* | 8/2019 | Park | H04L 5/0055 |
| 2019/0327723 | A1* | 10/2019 | Li | H04L 1/1854 |
| 2019/0327743 | A1* | 10/2019 | Shi | H04L 5/0055 |
| 2020/0008090 | A1* | 1/2020 | Chen | H04W 72/14 |
| 2020/0053765 | A1* | 2/2020 | Chien | H04L 1/1854 |
| 2020/0092906 | A1* | 3/2020 | Golitschek Edler von Elbwart | H04W 48/16 |
| 2020/0145167 | A1* | 5/2020 | Jung | H04L 5/0007 |
| 2020/0145988 | A1* | 5/2020 | Seo | H04L 1/0026 |
| 2020/0146096 | A1* | 5/2020 | Park | H04L 1/1671 |
| 2020/0163112 | A1* | 5/2020 | Lee | H04L 5/0053 |
| 2020/0196295 | A1* | 6/2020 | Oizumi | H04L 5/1469 |
| 2020/0205128 | A1* | 6/2020 | Baldemair | H04W 72/02 |
| 2020/0221317 | A1* | 7/2020 | You | H04W 4/70 |
| 2020/0221489 | A1* | 7/2020 | Babaei | H04W 72/042 |
| 2020/0252927 | A1* | 8/2020 | Yamamoto | H04W 72/04 |
| 2020/0267743 | A1* | 8/2020 | Kim | H04L 27/2602 |

OTHER PUBLICATIONS

Sharp et al., "Reduced processing time for different UL and DL sTTI lengths", 3GPP TSG RAN WG1 Meeting #86, R1-167614, Aug. 2016, 4 pages.
ISR/KR, "International Search Report and Written Opinion of the International Searching Authority," International Application No. PCT/KR2018/000625, dated Apr. 26, 2018, 13 pages.
CATT, "Explicit HARQ and scheduling timing design for LTE sTTI," R1-1611360, 3GPP TSG RAN WG1 Meeting #87, Reno, USA, Nov. 14-18, 2016, 3 pages.
Nokia, et al., "SPS Design for SC-MTCH," R1-1611488, 3GPP TSG RAN WG1 Meeting #87, Reno, USA, Nov. 14-18, 2016, 3 pages.
NTT Docomo, Inc., "Views on processing time reduction and related procedures," R1-1612698, 3GPP TSG RAN WG1 Meeting #87, Reno, USA, Nov. 14-18, 2016, 8 pages.
Samsung, "TDD DL HARQ-ACK feedback procedure for processing time reduction with 1ms TTI," R1-1612402, 3GPP TSG RAN WG1 Meeting #87, Reno, USA, Nov. 14-18, 2016, 3 pages.
3GPP TS 38.211 V15.3.0 (Sep. 2018), Technical Specification, 3rd Generation Partnership Project; Technical Specification Group Radio Access Network; NR; Physical channels and modulation (Release 15), Sep. 2018, 96 pages.
3GPP TS 38.213 V15.3.0 (Sep. 2018), Technical Specification, 3rd Generation Partnership Project; Technical Specification Group Radio Access Network; NR; Physical layer procedures for control (Release 15), Sep. 2018, 101 pages.

* cited by examiner

[Fig. 1]
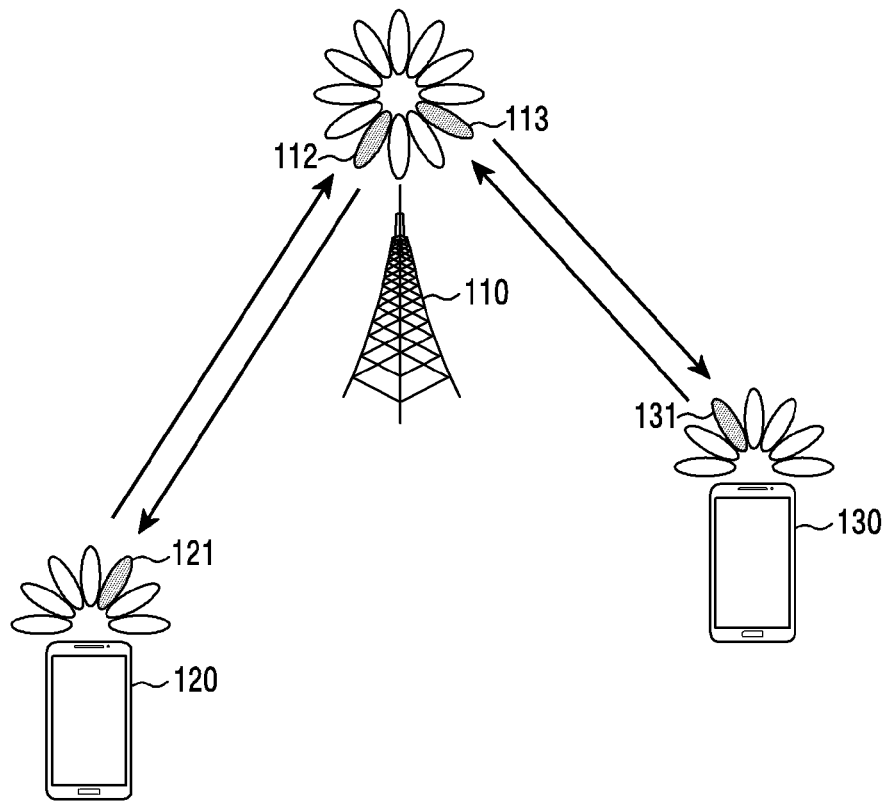
[Fig. 2]
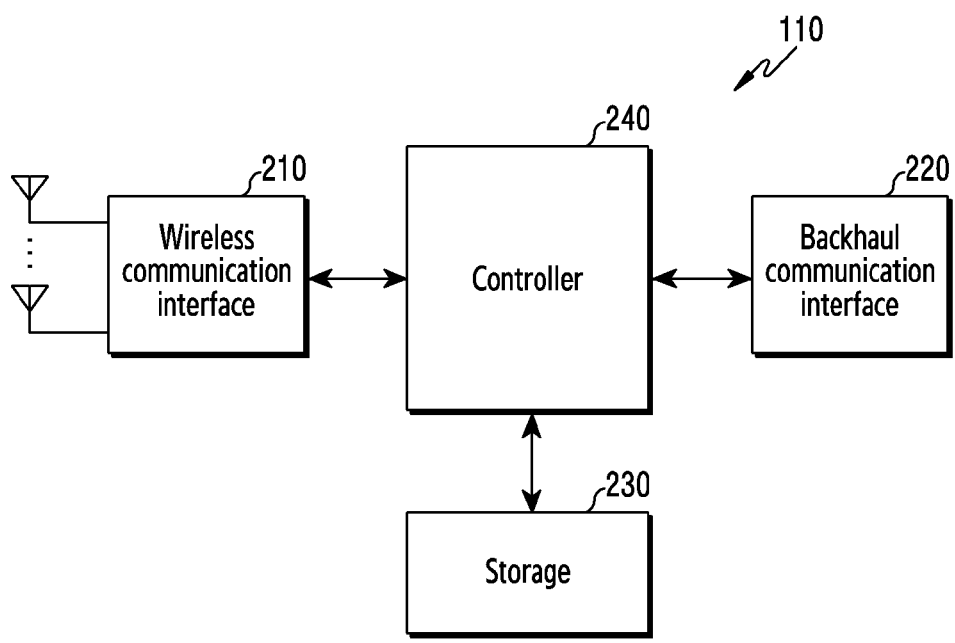

[Fig. 3]
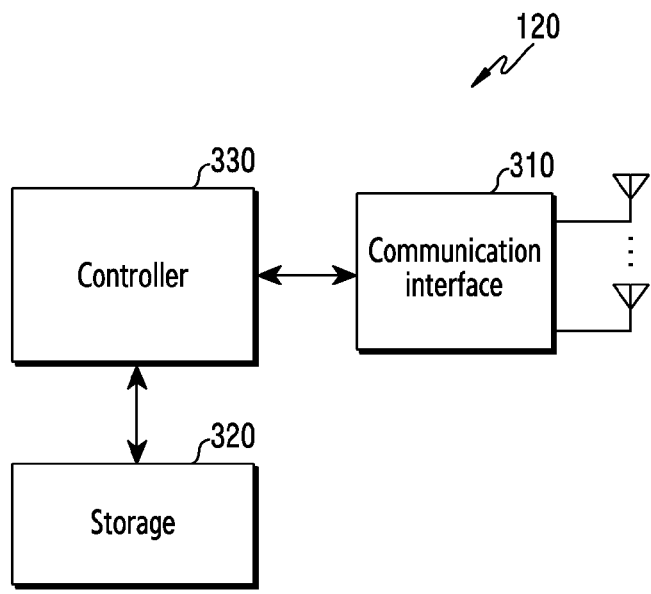
[Fig. 4]
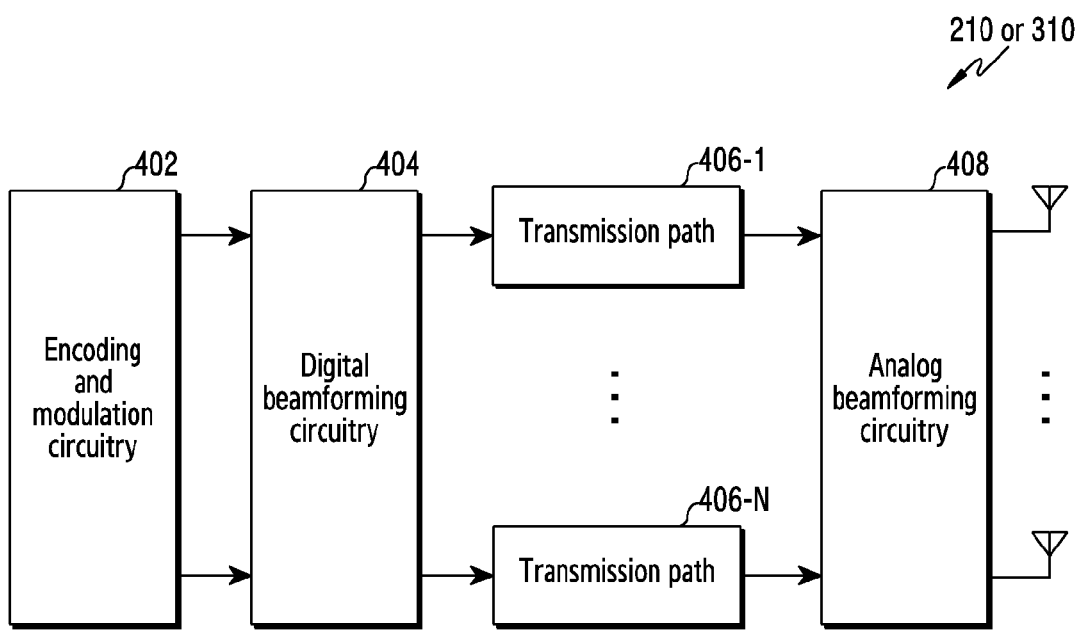

[Fig. 5]
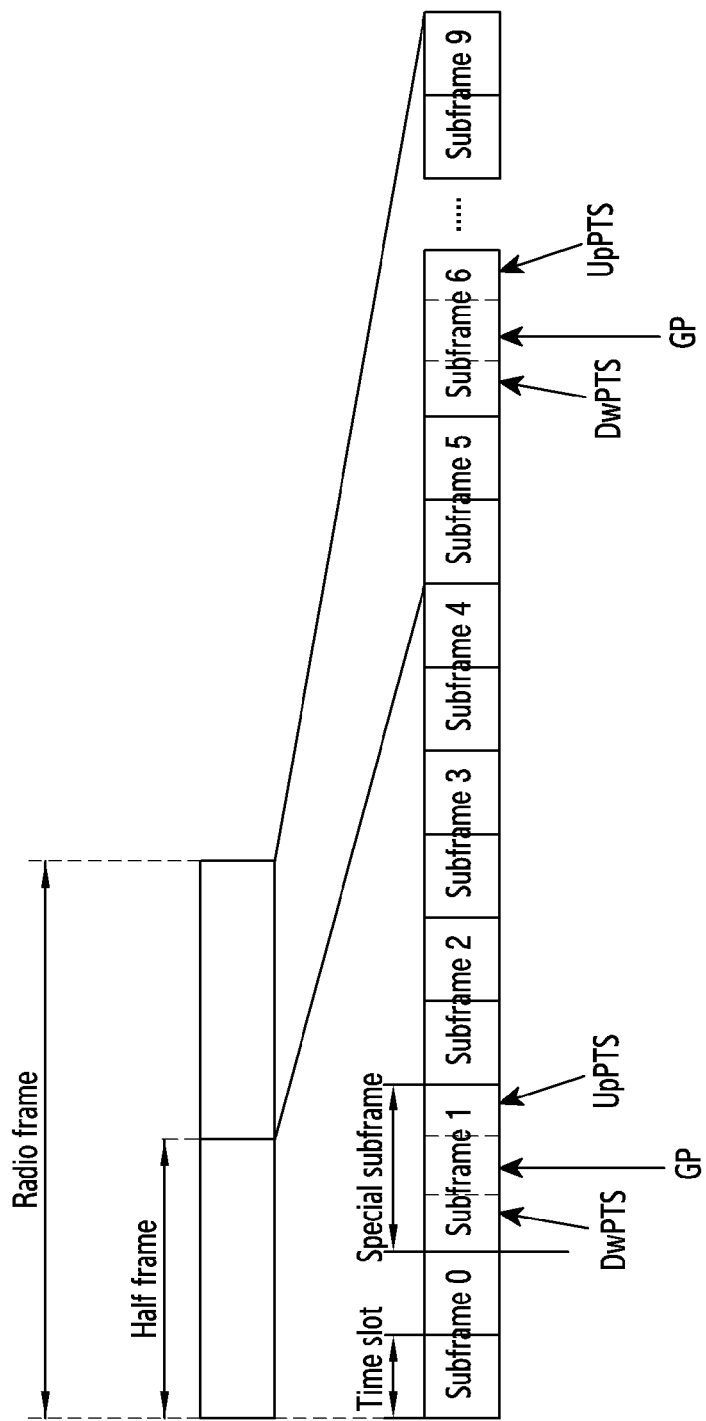

[Fig. 6]
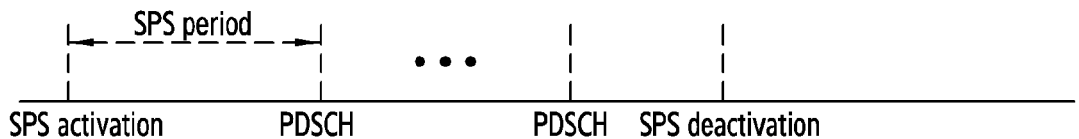
[Fig. 7]
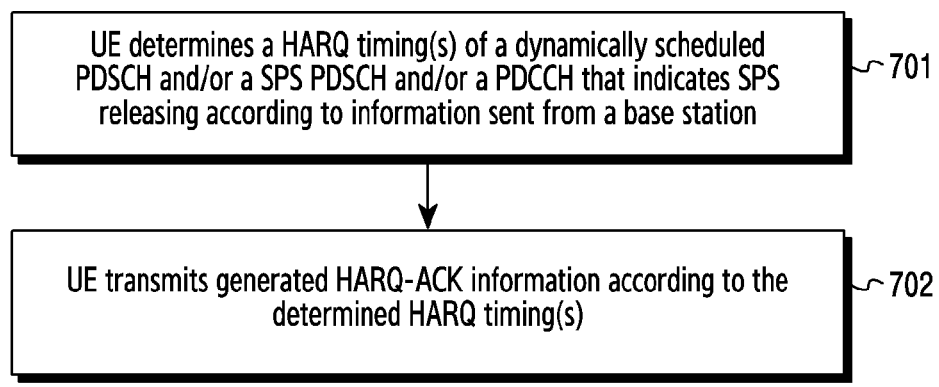
[Fig. 8]
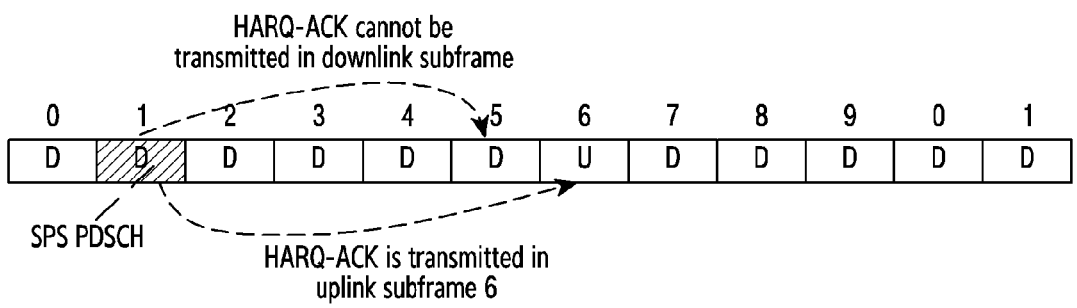

[Fig. 9]
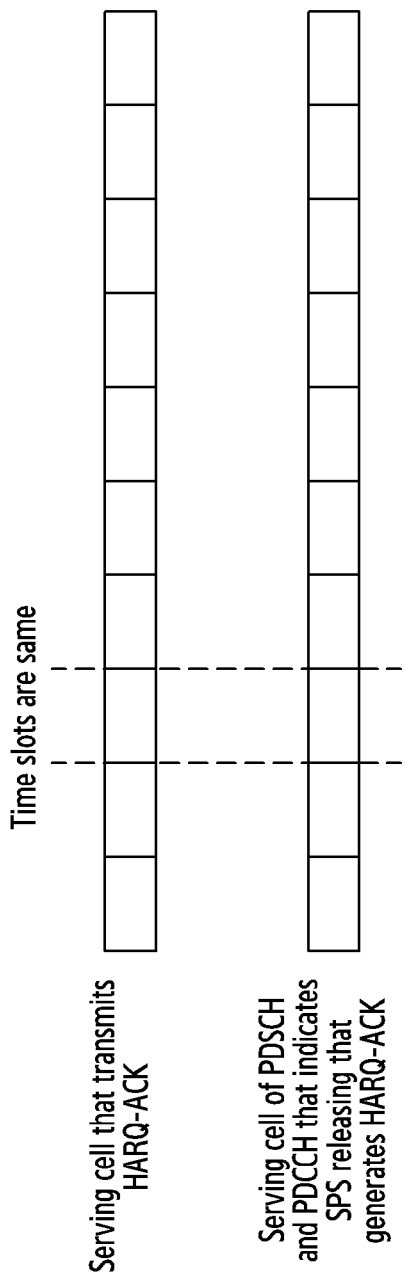

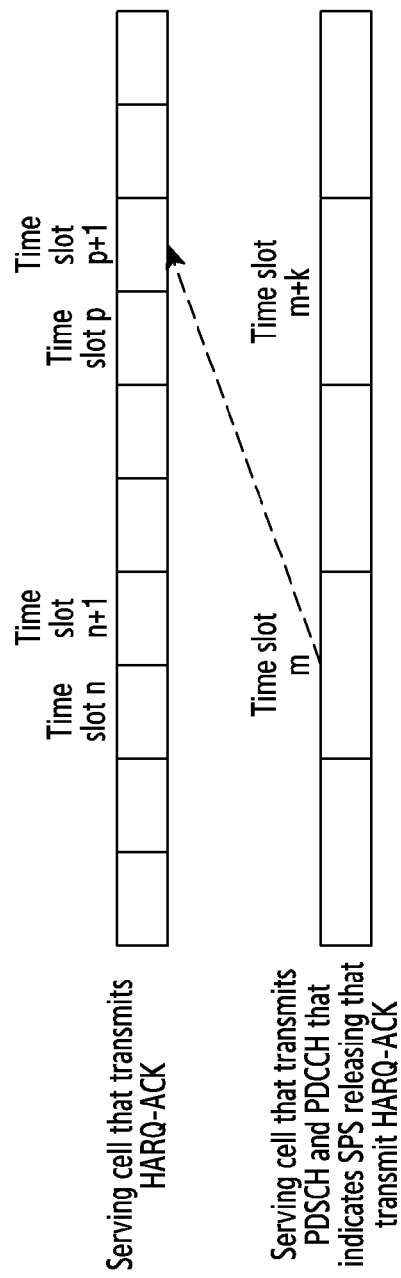
[Fig. 10]

[Fig. 11]
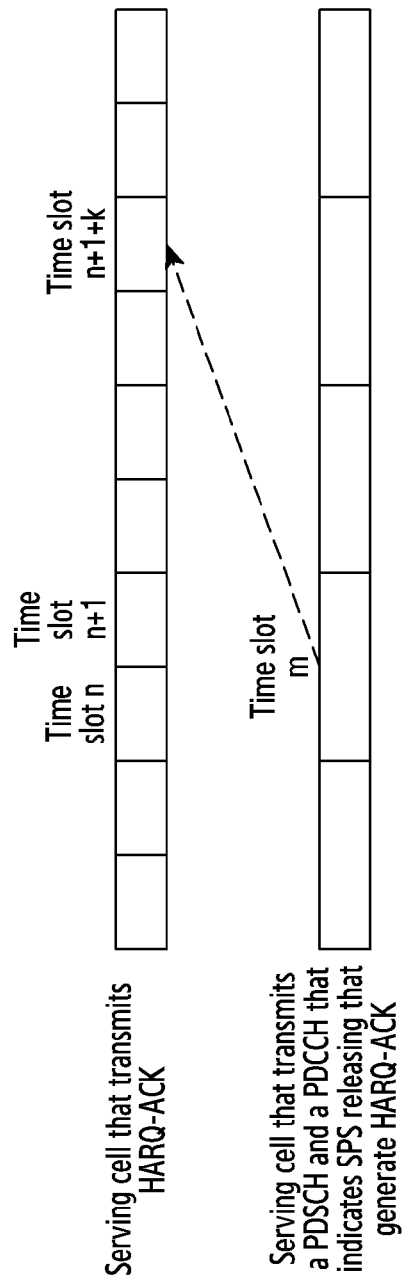

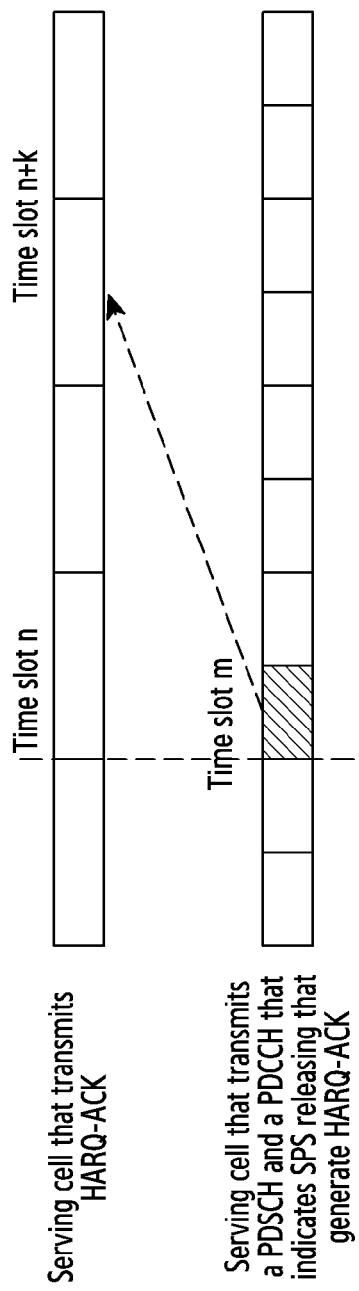
[Fig. 12]

[Fig. 13]
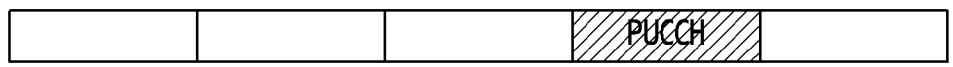
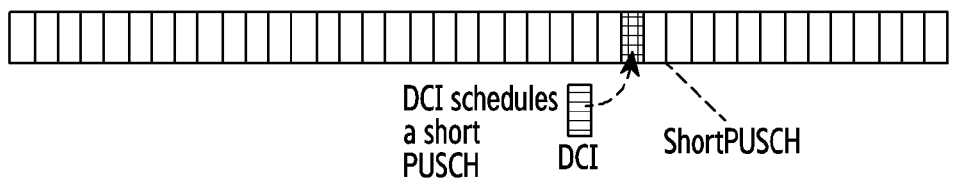
[Fig. 14]
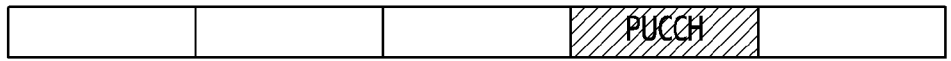
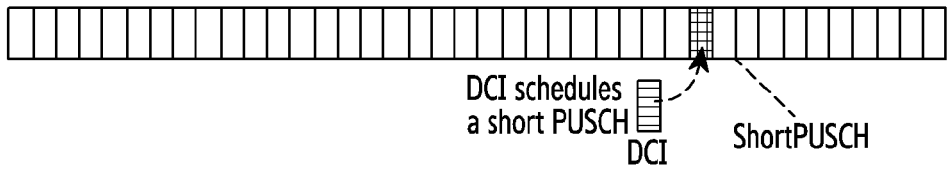

[Fig. 15]
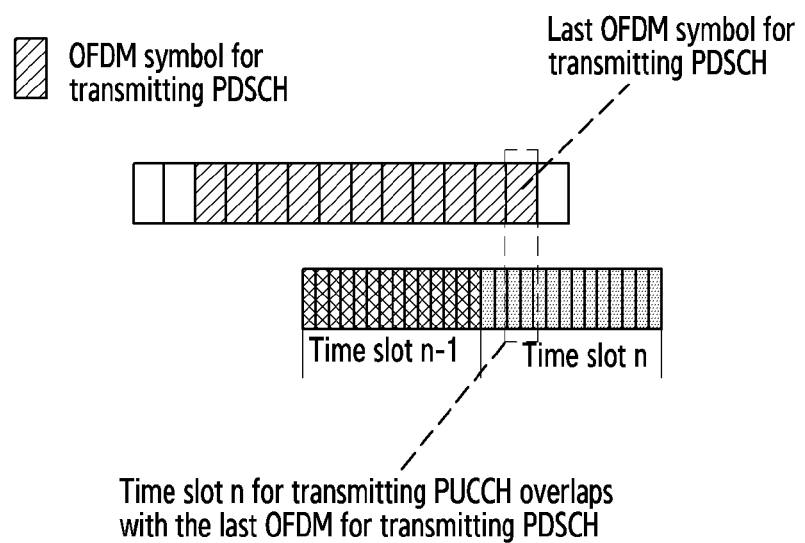
[Fig. 16]
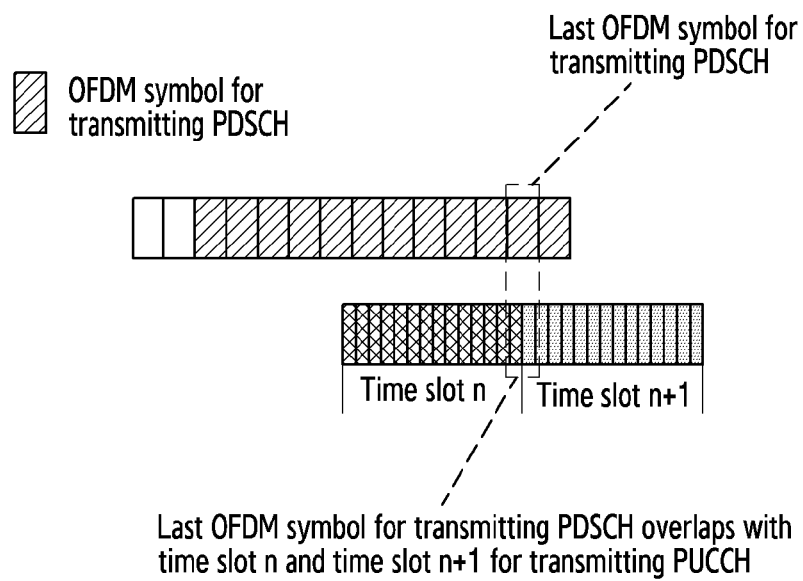

[Fig. 17]
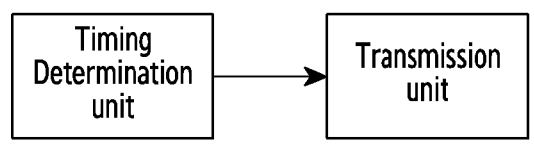

METHOD AND APPARATUS FOR TRANSMITTING UCI IN WIRELESS COMMUNICATION SYSTEM

CROSS-REFERENCE TO RELATED APPLICATIONS

This application is a 371 National Stage of International Application No. PCT/KR2018/000625, filed Jan. 12, 2018, which claims priority to Chinese Patent Application No. 201710025986.1, filed Jan. 13, 2017, Chinese Patent Application No. 201710086169.7, filed Feb. 17, 2017, Chinese Patent Application No. 201710179057.6, filed Mar. 23, 2017, Chinese Patent Application No. 201710261062.1, filed Apr. 20, 2017, Chinese Patent Application No. 201710852004.6, filed Sep. 19, 2017, the disclosures of which are herein incorporated by reference in their entirety.

BACKGROUND

1. Field

The present disclosure relates to radio communications, and in particular to a method and apparatus for transmitting uplink control information (UCI) of a physical downlink shared channel (PDSCH).

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

The present disclosure provides a method for transmitting UCI, so that timings between a dynamically scheduled PDSCH, a SPS PDSCH and a PDCCH that indicates SPS releasing and HARQ-ACK are relatively simple, so as to transmit HARQ-ACK information efficiently.

A method for transmitting uplink control information (UCI) includes:
determining, by a user equipment, a hybrid automatic retransmission request (HARQ) timing or HARQ timings of a dynamically scheduled physical downlink shared channel (PDSCH) and/or a semi-persistent scheduling (SPS) PDSCH and/or a physical downlink control channel (PDCCH) that indicates SPS releasing according to information sent from a base station, and
transmitting, by the user equipment, generated hybrid automatic retransmission request acknowledgement (HARQ-ACK) information according to the HARQ timing or the HARQ timings determined.

Preferably, determining a HARQ timing or HARQ timings of the SPS PDSCH and/or the PDCCH that indicates SPS releasing according to the information sent from the base station includes at least one of the following: determining the HARQ timing or the HARQ timings of the SPS PDSCH and/or the PDSCH that indicates SPS releasing according to first higher layer signaling sent from the base station; determining the HARQ timing or the HARQ timings of the SPS PDSCH and/or the PDSCH that indicates SPS releasing according to an indication indicated by system information; determining the HARQ timing or the HARQ timings of the SPS PDSCH and/or the PDSCH that indicates SPS releasing according to a preset by a protocol; determining the HARQ timing or the HARQ timings of the SPS PDSCH and/or the PDSCH that indicates SPS releasing according to a default timing; and determining the HARQ timing or the HARQ timings of the SPS PDSCH and/or the PDSCH that indicates SPS releasing according to a PDSCH HARQ timing received in a common search space.

Preferably, determining a HARQ timing of the dynamically scheduled PDSCH according to the information sent from the base station includes: determining the HARQ timing of the dynamically scheduled PDSCH according to the first higher layer signaling, in which the HARQ timing or the timings of the SPS PDSCH and the PDCCH that indicates SPS releasing and the HARQ timing of the dynamically scheduled PDSCH are same; or determining the HARQ timing of the dynamically scheduled PDSCH according to second higher layer signaling sent from the base station, in which the first higher layer signaling and the second higher layer signaling is transmitted separately; or determining the HARQ timing of the dynamically scheduled PDSCH according to an indication indicated by downlink control information (DCI) which is channel state information of the dynamically scheduled PDSCH sent from the base station.

Preferably, the first higher layer signaling is higher layer signaling specific to the user equipment, or common broadcast higher layer signaling, or higher layer signaling sent to a group of user equipments.

Preferably, determining a HARQ timing or HARQ timings of the SPS PDSCH and/or the PDCCH that indicates SPS releasing according to the information sent from the base station includes:
determining the HARQ timing or the HARQ timings of the SPS PDSCH and/or the PDCCH that indicates SPS releasing according to a DCI indication for SPS activation sent from the base station.

Preferably, the DCI indication that activates the SPS PDSCH includes HARQ timing indication information, and the HARQ timing indication information includes N bits used to indicate a HARQ timing of a PDSCH within a time duration from this time of activation to deactivation and/or a HARQ timing of the PDCCH that indicates SPS releasing within the time duration from this time of activation to deactivation.

Preferably, the N bits of the HARQ timing indication information respectively correspond to different $k_i$, where HQRQ-ACK of the SPS PDSCH and/or the PDCCH that indicating SPS releasing transmitted in a time slot n is transmitted in a time slot $n+k_i$, where $k_i$ is an integer larger than or equal to 0.

Preferably, values of $k_i$ and mappings between the values of $k_i$ and different values of the N bits are preset or preconfigured by higher layer signaling.

Preferably, the values of $k_i$ includes two groups: a first group of values of $k_i$ and a second group of values of $k_i$, and corresponding to the two groups of values of $k_i$, mappings between the different values of the N bits and $k_i$ are respectively configured;

in a circumstance where the HARQ-ACK information is to be transmitted on a first type of physical uplink control channel (PUCCH), the first group of values of $k_i$ and corresponding mappings between the different values of the N bits and $k_i$ are used, and in a circumstance where the HARQ-ACK information is to be transmitted on a second type of PUCCH, the second group of values of $k_i$ and corresponding mappings between the different values of the N bits and t $k_i$ are used.

Preferably, determining a HARQ timing of the dynamically scheduled PDSCH according to the information sent from the base station includes:

determining the HARQ timing of the dynamically scheduled PDSCH according to higher layer signaling sent from the base station; or determining the HARQ timing of the dynamically scheduled PDSCH according to a DCI indication of the dynamically scheduled PDSCH sent from the base station.

Preferably, the first higher layer signaling or the second higher layer signaling or the higher layer signaling contains a value of k; where HARQ-ACK of the dynamically scheduled PDSCH and/or the SPS PDSCH and/or the PDCCH that indicates SPS releasing transmitted in a time slot n is transmitted in a time slot n+k, where n is an integer larger than or equal to 0, and k is an integer larger than or equal to 0. In a circumstance where HARQ-ACK information is transmitted in different types of PUCCHs, values of k are respectively configured by the higher layer signaling.

Preferably, in a circumstance where the HARQ timing of the dynamically scheduled PDSCH is determined according to the DCI indication of the dynamically scheduled PDSCH, the number N' of bits of the HARQ timing indication information included in the DCI of the dynamically scheduled PDSCH is the same with or different from N.

Preferably, $k_i'$ corresponding to the N' bits are the same with $k_i$; or the $k_i'$ corresponding to the N' bits and the $k_i$ are configured independently or preset independently;

in which HARQ-ACK corresponding to a dynamically scheduled PDCCH transmitted in a time slot n is transmitted in a time slot $n+k_i'$.

Preferably, in response to determining that a time slot that is used to transmit the HARQ-ACK information cannot be used to transmit the HARQ-ACK information according to the HARQ-ACK timing, the HARQ-ACK information is transmitted in a first time slot that is allowed to transmit HARQ-ACK information after the time slot that is used to transmit the HARQ-ACK information.

Preferably, if a time slot length of a serving cell that transmit the HARQ-ACK information is not changing, and a time slot length of a serving cell of a PDSCH or a PDCCH that indicates SPS releasing that generates the HARQ-ACK information is not changing, and the time slot length of the serving cell of the PDSCH or the PDCCH that indicates SPS releasing that transmits the HARQ-ACK information and the time slot length of the serving cell that transmits the HARQ-ACK information are the same, then a time unit indicated by the HARQ-ACK timing is the time slot length of the serving cell that transmits the HARQ-ACK information;

and/or if the time slot length of the serving cell that transmits the HARQ-ACK information is not changing, the time slot length of the serving cell of the PDSCH or the PDCCH that indicates SPS releasing that generates the HARQ-ACK information is not changing, and the time slot length of the serving cell that transmits the HARQ-ACK information is larger than the time slot length of the serving cell of the PDSCH or the PDCCH that indicates SPS releasing that generates the HARQ-ACK information, then the time unit indicated by the HARQ-ACK timing is the time slot length of the serving cell of the PDSCH or the PDCCH that indicates SPS releasing that generates the HARQ-ACK information; and transmitting the HARQ-ACK information includes: transmitting the HARQ-ACK information in a set time slot out of time slots p, . . . , p+L of the serving cell that transmits the HARQ-ACK information that overlap with a time slot m+k' of the serving cell of the PDSCH or the PDCCH that indicates SPS releasing that generates the HARQ-ACK information, where L is a positive integer, k' is a positive integer indicated by higher layer signaling or physical layer signaling, m is a number of a time slot where the PDSCH or the PDCCH that indicates SPS releasing that generates the HARQ-ACK information is located, and m is larger than or equal to 0; and/or, if the time slot length of the serving cell that transmits the HARQ-ACK information is not changing, and the time slot length of the serving cell of the PDSCH or the PDCCH that indicates SPS releasing that generates the HARQ-ACK information is not changing, and the time slot length of the serving cell of the PDSCH or the PDCCH that indicates SPS releasing that generates the HARQ-ACK information is larger than the time slot length of the serving cell that transmits the HARQ-ACK information, then the time unit indicated by the HARQ-ACK timing is the time slot length of the serving cell that transmits the HARQ-ACK information; and transmitting the HARQ-ACK information includes: transmitting the HARQ-ACK information in a time slot n+l+k' of the serving cell that transmits the HARQ-ACK information, where l is a positive integer larger than or equal to 0 and smaller than or equal to L, the time slot m where the PDCCH of the PDSCH or the PDCCH that indicates SPS releasing that generates the HARQ-ACK information overlaps with time slots n', . . . , n'+L of the serving cell that transmits the HARQ-ACK information, where n' is an integer larger than or equal to 0, and L is a positive integer;

and/or if the time slot length of the serving cell that transmits the HARQ-ACK information is not changing, the time slot length of the serving cell of the PDSCH or the PDCCH that indicates SPS releasing that generates the HARQ-ACK information is not changing, and the time slot length of the serving cell of the PDSCH or the PDCCH that indicates SPS releasing that generates the HARQ-ACK information is smaller than the time slot length of the serving cell that transmits the HARQ-ACK information, then the time unit indicated by the HARQ-ACK timing is the time slot length of the serving cell that transmits the HARQ-ACK information; and transmitting the HARQ-ACK information includes: transmitting the HARQ-ACK information in a time slot n'+k' of the serving cell that transmits the HARQ-ACK information, where a time slot m where the PDSCH or the PDCCH that indicates SPS releasing that generates the HARQ-ACK information is located overlaps with the time slot n' of the serving cell that transmits the HARQ-ACK information in the time aspect, and m and n' are integers larger than or equal to 0.

Preferably, when a time slot length of PUCCHs for UCI transmission and a time slot length of PUSCHs for data transmission configured by the UE are same, or when a time slot length of at least one PUSCH scheduled for data transmission is smaller than the time slot length of the PUCCHs, and the at least one PUSCH for data transmission that has the same time slot length with the time slot length of the PUCCHs, and the UE determines to transmit UCI on the PUSCH according to a serving cell ID, the method further includes:

in a circumstance where the UE is configured to be allowed to transmit a PUCCH and a PUSCH at the same time, at least transmit one PUSCH, and only have periodic CSI to transmit, then transmitting, by the UE, the periodic CSI on the PUCCH;

and/or, in a circumstance where the UE is configured to be allowed to transmit PUCCH and PUSCH at the same time, at least transmit one PUSCH, and only have HARQ-ACK feedback information/SR to transmit, then transmitting, by the UE, the HARQ-ACK/SR on the PUCCH;

and/or, in a circumstance where the UE is configured to be allowed to transmit a PUCCH and a PUSCH at the same time, at least transmit one PUSCH, and transmit periodic CSI and HARQ-ACK at the same time, then transmitting, by the UE, the HARQ-ACK on the PUCCH and transmitting the periodic CSI on a PUSCH of serving cell that has a smallest serving cell number;

and/or, in a circumstance where the UE is configured to be allowed to transmit a PUCCH and a PUSCH at the same time, and have no PUSCH transmission, then transmitting, by the UE, periodic CSI and/or HARQ-ACK/SR on the PUCCH;

and/or in a circumstance where the UE is configured to forbid transmitting a PUCCH and a PUSCH at the same time, and at least transmit one PUSCH, then transmitting, by the UE, periodic CSI and/or HARQ-ACK/SR on the PUSCH of the serving cell that has the smallest serving cell number;

and/or, in a circumstance where the UE is configured to forbid transmitting a PUCCH and a PUSCH at the same time, and have no PUSCH transmission, then transmitting, by the UE, periodic CSI and/or HARQ-ACK/SR on the PUCCH.

Preferably, when the time slot length of the at least one PUSCH scheduled for data transmission is smaller than the time slot length of the PUCCH, the method further includes:

in a circumstance where only a PUSCH that has a time slot length shorter than that of the PUCCH is scheduled, or the UE determines to transmit the UCI on the PUSCH shorter than the PUCCH, then transmitting, by the UE, only on the PUCCH;

and/or, in a circumstance where only the PUSCH that has the time slot length shorter than that of the PUCCH is scheduled, or where the UE determines to transmit the UCI on the PUSCH that is shorter than the PUCCH, and if DCI that schedules the PUSCH is before the PUCCH and has an interval t with the PUCCH, where $t1 \leq t \leq t2$, then transmitting, by the UE, all UCI on the PUSCH that is shorter than the PUCCH; where $t1 \geq 0$, $t2 > t1$;

and/or, in a circumstance where only the PUSCH that has the time slot length shorter than that of the PUCCH is scheduled, or where the UE determines to transmit the UCI on the PUSCH that is shorter than the PUCCH, and if the DCI that schedules the PUSCH is before the PUCCH starts and has an interval smaller than t1 with the PUCCH, or if the DCI that schedules the PUSCH is after the PUCCH starts to transmit, then the UE transmits all UCI on the PUCCH; where $t1 \geq 0$.

A method for transmitting SPS PDSCH, includes:
determining, by a user equipment, a timing between a PDCCH for SPS activation and a first SPS PDSCH according to information sent from a base station.

A method for transmitting SPS PUSCH, includes:
determining, by a user equipment, a timing between a PDCCH for SPS activation and a first semi-persistent scheduling PUSCH according to information sent from a base station.

An apparatus for transmitting UCI information, includes:
a timing determination unit and a transmission unit; in which
the timing determination unit is to determine a hybrid automatic retransmission request (HARQ) timing or HARQ timings of a dynamically scheduled physical downlink shared channel (PDSCH) and/or a semi-persistent scheduling (SPS) PDSCH and/or a physical downlink control channel (PDCCH) that indicates SPS releasing according to information sent from a base station; and
the transmission unit is to transmit generated hybrid automatic retransmission request acknowledgement (HARQ-ACK) information according to the HARQ timing or the HARQ timings determined.

As can be seen from the foregoing technical solutions, the method for transmitting UCI provided according to the present disclosure can simplify HARQ-ACK feedback information of a dynamically scheduled PDSCH, a SPS PDSCH, and a PDCCH that indicates SPS releasing.

BRIEF DESCRIPTION OF THE DRAWINGS

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 illustrates a schematic diagram of a frame structure of a LTE TDD system;

FIG. 6 illustrates a schematic diagram of SPS PDSCH transmission;

FIG. 7 illustrates a schematic diagram of a flow of a method for transmitting UCI according to the present disclosure;

FIG. 8 illustrates a schematic diagram showing a situation where HARQ-ACK cannot be transmitted in a time slot n+k;

FIG. 9 illustrates a first schematic diagram of a time unit indicated by a timing in Embodiment 2;

FIG. 10 illustrates a second schematic diagram of a time unit indicated by a timing in Embodiment 2;

FIG. 11 illustrates a third schematic diagram of a time unit indicated by a timing in Embodiment 2;

FIG. 12 illustrates a fourth schematic diagram of a time unit indicated by a timing in Embodiment 2;

FIG. 13 illustrates a schematic diagram for transmitting all UCI on a short PUSCH in Embodiment 3;

FIG. 14 illustrates a schematic diagram for transmitting all UCI on a PUCCH in Embodiment 3; and FIG. 15 illustrates a first schematic diagram of indicating a timing in Embodiment 5;

FIG. 16 illustrates a second schematic diagram of indicating a timing in Embodiment 5; and FIG. 17 illustrates a schematic diagram of a structure of an apparatus for transmitting UCI according to the present disclosure.

DETAILED DESCRIPTION

To make the objects, technical measures and advantages of the present disclosure more clear, the present disclosure will be further illustrated in combination with the attached drawings.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for transmitting UCI in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may determine a hybrid automatic retransmission request (HARQ) timing of a dynamically scheduled physical downlink shared channel (PDSCH) and/or a semi-persistent scheduling (SPS) PDSCH and/or a physical downlink control channel (PDCCH) that indicates SPS releasing according to information sent from a base station; and control the wireless communication interface 310 to transmit generated hybrid automatic retransmission request acknowledgement (HARQ-ACK) information according to the HARQ timing or the HARQ timings determined. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Long term evolution (LTE) techniques support two types of duplexing: frequency division duplexing (FDD) and time division duplexing (TDD). FIG. 5 is a schematic diagram of a frame structure of a LTE TDD system. In FIG. 5, each radio frame is 10 milliseconds (ms) long, and is equally divided into two half frames having a length of 5 ms each. Each half frame includes 8 time slots having a length of 0.5 ms each and 3 special fields having an overall length of 1 ms. The 3 special fields are respectively a downlink pilot time slot (DwPTS), a guard period (GP), and an uplink pilot time slot (UpPTS). Each subframe consists of two consecutive time slots.

Transmissions in a TDD system include a transmission from a base station to a user equipment (UE) (referred to as an uplink) and a transmission from the UE to the base station (referred to as a downlink). Based on the frame structure shown in FIG. 5, downlinks and uplinks share 10 subframes in every 10 ms, and each subframe is configured either for an uplink or for a downlink. A subframe configured for an uplink is called an uplink subframe, and a subframe configured for a downlink is called a downlink subframe. The TDD system supports 7 TDD uplink and downlink configurations, as shown in Table 1, where "D" represents a downlink subframe, "U" represents an uplink subframe and "S" represents a special subframe containing the 3 special fields.

TABLE 1

TDD uplink and downlink configurations

| Config-uration | Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Hybrid automatic retransmission request acknowledgement (HARQ-ACK) information of a PDSCH may be transmitted on a physical uplink shared channel (PUSCH) or on a physical uplink control channel (PUCCH). For a PDSCH and PUCCH timing, assuming that a UE feeds back HARQ-ACK feedback information on a PUCCH in a subframe n, then the PUCCH indicates HARQ-ACK feedback information of a PDSCH or PDCCH/EPDCCH that indicates semi-persistent scheduling (SPS) releasing in a downlink subframe n−k, where k∈K. The values of K of TDD configurations are defined in Table 2, where K is a set consisting of M elements $\{k_0, k_1, \ldots k_{M-1}\}$ and is related to subframe numbers and TDD uplink and downlink configurations, referred to as a downlink association set, and the element k is referred to as a downlink association element, and for FDD, k=4. Hereinafter, downlink subframes corresponding to a downlink association set is referred to as a bundling window, i.e., for all the elements k in K, n−k constitutes a set {n−k, k∈K}. In PUCCH subframes, one PUCCH resource is allocated for each PDSCH of each downlink subframe to feed back HARQ-ACK feedback information.

TABLE 2 downlink association set of TDD uplink and downlink configurations

| Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As can be seen from the foregoing, the traditional HARQ timing is fixed, and it is generally determined by a protocol, and thus, when a new TDD configuration is used, a new timing needs to be generated, which causes a relatively large workload.

As described above, the traditional HARQ timing is fixed, and when a new TDD configuration is used, a new timing needs to be regenerated, which causes a relatively large workload. To improve this situation, the present disclosure determines a HARQ timing according to a configuration configured semi-statically or according to an indication dynamically indicated by downlink control information (DCI). In addition, for the case of semi-persistent scheduling (SPS), the scheduling is performed by using DCI to perform activation/deactivation, and in this case, after a PDCCH used for SPS activation and before a PDCCH used for SPS deactivation, PDSCH transmission is no longer scheduled by PDCCHs, but starting from a PDSCH activated, PDSCH transmission is performed according to a period configured by higher layer signaling, until deactivation, and as shown in FIG. 6. The present disclosure also describes how to determine the HARQ timing of a PDSCH scheduled by SPS.

To achieve the object of the present disclosure, the present disclosure provides a method for transmitting UCI, and the method is mainly focused on HARQ-ACK feedback information transmission. As shown in FIG. 7, the method includes the following steps:

Step 701: a UE determines a HARQ timing(s) of a dynamically scheduled PDSCH and/or a SPS PDSCH and/or a PDCCH that indicates SPS releasing according to information sent from a base station.

The information sent from the base station may be higher layer signaling, physical layer signaling, etc. To be specific, the HARQ timing(s) of the SPS PDSCH and/or the PDSCH that indicates SPS releasing may be determined according to the higher layer signaling sent from the base station, or according to an DCI indication that activates the SPS PDSCH, or the HARQ timing (s) of the SPS PDSCH and/or the PDSCH that indicates SPS releasing may be determined according to a preset by a protocol, or the HARQ timing(s) of the SPS PDSCH and/or the PDSCH that indicates SPS releasing may be determined according to an indication of system information, or the HARQ timing(s) of the SPS PDSCH and/or the PDSCH that indicates SPS releasing may be determined according to a default timing, or the HARQ timing(s) of the SPS PDSCH and/or the PDSCH that indicates SPS releasing is/are the same with a HARQ timing of a PDSCH received in a common search space.

Step 702: the UE transmits generated HARQ-ACK information according to the determined HARQ timing(s) of the dynamically scheduled PDSCH and/or the SPS PDSCH and/or the PDCCH that indicates SPS releasing.

The generated HARQ-ACK information herein may be transmitted on a PUCCH and/or on a PUSCH.

The technical solution of the present disclosure will be further described in detail through several preferable embodiments.

Embodiment 1

In the present embodiment, HARQ timings of a dynamically scheduled PDSCH, a SPS PDSCH and a PDCCH that indicates SPS releasing will be described based on the following two situations:

First situation: for a UE, the HARQ timing of a dynamically scheduled PDSCH of the UE is determined according to a configuration semi-statically configured by higher layer signaling.

For the first situation, the HARQ timings of a SPS PDSCH and a PDCCH that indicates SPS releasing are the same with the HARQ timing of the dynamically scheduled PDSCH, and they are determined uniformly according to a configuration configured by the higher layer signaling. That is, the HARQ timing configured by the higher layer signaling is not only applicable to the dynamically scheduled PDSCH, but also applicable to the SPS PDSCH and the PDCCH that indicates SPS releasing, and only one piece of higher layer signaling may be used to perform the configuration. Or, for the first situation, the HARQ timings of the SPS PDSCH and the PDCCH that indicates SPS releasing and the HARQ timing of the dynamically scheduled PDSCH of the UE are configured separately by independent pieces of higher layer signaling. In this case, the HARQ timings of the SPS PDSCH and the PDCCH that indicates SPS releasing and the HARQ timing of the dynamically scheduled PDSCH are different.

In addition, when the higher layer signaling configures the timings, it may configure the values of k directly. For a dynamically scheduled PDSCH, a SPS PDSCH or a PDCCH that indicates SPS releasing transmitted in a time slot n, HARQ-ACK of it is transmitted in a time slot n+k. For each serving cell that generates HARQ-ACK, the values of k are separately configured for it.

For the dynamically scheduled PDSCH (or SPS PDSCH or PDCCH that indicates SPS releasing) transmitted in the time slot n, when the HARQ-ACK information generated by the dynamically scheduled PDSCH (or by the SPS PDSCH or by the PDCCH that indicates SPS releasing) is transmitted on different types of PUCCHs, the values of k are configured by higher layer signaling separately.

For the SPS PDSCH or PDCCH that indicates SPS releasing transmitted in the time slot n, when the HARQ-ACK information generated by the SPS PDSCH or by the PDCCH that indicates SPS releasing is transmitted on different types of PUCCHs, the values of k are configured by higher layer signaling separately.

The "different types" described herein refers to that the lengths of the PUCCHs may be different, and the PUCCHs may be divided into long PUCCHs and short PUCCHs. For example, a long PUCCH (or referred to as a first type of PUCCH) refers to a PUCCH that occupies at least M (M is a positive integer, configured by higher layer signaling or preset by a protocol, for example, M is equal to 4) OFDM symbols, and a short PUCCH (or referred to as a second type of PUCCH) refers to a PUCCH that occupies at most M'(M' is a positive integer, configured by higher layer signaling or preset by a protocol, for example, M' is equal to 2) ODFM symbols, where M>M'.

Second situation: for a UE, the HARQ timing of a dynamically scheduled PDSCH of the UE is determined by being dynamically indicated by DCI. DCI refers to DCI of the dynamically scheduled PDSCH.

The DCI of the dynamically scheduled PDSCH may include HARQ timing indication information, and the HARQ timing indication information includes N' bits to indicate the HARQ timing. To be specific, different values may be preset for the N' bits, corresponding to different $k_i'$, where the HARQ-ACK of a SPS PDSCH or PDCCH that indicates SPS releasing transmitted in a time slot n is transmitted in a time slot $n+k_i'$. For each serving cell that generates HARQ-ACK, the number N' of bits included in its HARQ timing indication information may be different, and each serving cell may be configured separately by higher layer signaling.

For the second situation, the following methods may be used to determine the HARQ timings of the SPS PDSCH and the PDCCH that indicates SPS releasing of the UE.

Method 1:

The HARQ timings of the SPS PDSCH and the PDCCH that indicates SPS releasing are configured by higher layer signaling. For example, the higher layer signaling configures that for the SPS PDSCH or PDCCH that indicates SPS releasing transmitted in the time slot n, its HARQ-ACK is transmitted in a time slot n+k, where the value of k is configured by the higher layer signaling, and the value of k may be configured for each UE by higher layer signaling specific to the UE; or may be configured for all UEs through common higher layer signaling broadcasted, or may be configured for a group of UEs through higher layer signaling of the group of UEs. For example, k is equal to 4.

If the time slot n+k is a downlink time slot, or due to other reasons, the time slot n+k cannot be used to transmit HARQ-ACK, then the HARQ-ACK may be transmitted in the first uplink time slot that can be used to transmit HARQ-ACK after the time slot n+k, as shown in FIG. 8.

Method 2:

The HARQ timing of the SPS PDSCH is indicated by DCI for SPS activation, the DCI that activates the SPS PDSCH includes HARQ timing indication information, and the HARQ timing indication information includes N bits, used to indicate the HARQ timing. To be specific, different values may be preset for the N bits, corresponding to different $k_i$, where for the SPS PDSCH or PDCCH that indicates SPS releasing transmitted in the time slot n, its HARQ-ACK is transmitted in a time slot $n+k_i$. For example, a detailed indicating method is as shown in FIG. 7, where N is equal to 2. The HARQ timing indicated by the HARQ timing indication information included in the DCI that activates the SPS PDSCH is applicable to PDSCHs within a time duration from this time of activation to deactivation, and is also applicable to PDCCHs that indicate SPS releasing within the time duration from this time of activation to deactivation.

TABLE 3

Mapping between HARQ timing indication information and HARQ timing

| Value of HARQ timing indication information | Offset between HARQ transmission and PDSCH or PDCCH that indicates SPS releasing |
|---|---|
| 00 | $k_1$ ($k_1$ is configured by higher layer signaling or preset by a protocol) |
| 01 | $k_2$ ($k_2$ is configured by higher layer signaling or preset by a protocol) |
| 10 | $k_3$ ($k_3$ is configured by higher layer signaling or preset by a protocol) |
| 11 | $k_4$ ($k_4$ is configured by higher layer signaling or preset by a protocol) |

If signaling indicates that the time slot $n+k_i$ used to transmit the HARQ-ACK is a downlink time slot, or due to other reasons, the time slot $n+k_i$ cannot be used to transmit HARQ-ACK, then the HARQ-ACK may be transmitted in the first time slot that can be used to transmit HARQ-ACK after the time slot $n+k_i$.

The number N of bits of the HARQ timing indication information included in the DCI that activates the SPS PDSCH may be the same with the number N' of bits of the HARQ timing indication information included in the DCI of the dynamically scheduled PDSCH, and $k_i$ and $k_i'$ configured by the higher layer signaling or preset by the protocol are same; or the number N of bits of the HARQ timing indication information included in the DCI that activates the SPS PDSCH may be the same with the number N' of bits of the HARQ timing indication information included in the DCI of the dynamically scheduled PDSCH, and independent pieces of higher layer signaling may configure $k_i$ for the SPS PDSCH and the PDCCH that indicates SPS releasing, and configure $k_i'$ for the dynamically scheduled PDSCH, or the protocol presets that $k_i$ and $k_i'$ are independent of each other; or the number N of bits of the HARQ timing indication information included in the DCI that activates the SPS PDSCH may be different from the number N' of bits of the HARQ timing indication information included in the DCI of the dynamically scheduled PDSCH, and independent pieces of higher layer signaling separately configure $k_i$ for the SPS PDSCH and the PDCCH that indicates SPS releasing, and configure $k_i'$ for the dynamically scheduled PDSCH, or the protocol presets that $k_i$ and $k_i'$ are independent of each other.

As can be seen from the foregoing, the number N of bits of the HARQ timing indication information included in the DCI that activates the SPS PDSCH and the number N' of bits of the HARQ timing indication information included in the DCI of the dynamically scheduled PDSCH may be same or different; the configuration of the SPS PDSCH and the PDCCH that indicates SPS releasing or preset $k_i$ and the configuration of the dynamically scheduled PDSCH or the preset $k_i'$ may be performed uniformly or separately.

In addition, for the above two methods in the second situation, the example is provided using the DCI to indicate the HARQ timing of the dynamically scheduled PDSCH. However, no matter how the HARQ timing of the dynamically scheduled PDSCH is determined, the HARQ timing(s) of the SPS PDSCH and/or the PDCCH that indicates SPS releasing can all be determined using the above two methods.

What is described in the foregoing is the methods for determining a HARQ timing in Embodiment 1. In a traditional LTE system, the lengths of PUCCHs allocated for UEs are same, and so are for PDSCHs and PDCCHs. However, in the new communication system, the lengths of PUCCHs may be different, and the PUCCHs may be divided into long PUCCHs and short PUCCHs, and the same situation happens to PDSCHs and PDCCHs.

For example, a long PUCCH (or referred to as a first type of PUCCH) refers to a PUCCH that consists of M OFDM symbols counted backwards from the first OFDM symbol in a time slot, and a short PUCCH refers to a PUCCH that consists of M' OFDM symbols counted forwards from the last OFDM symbol in a time slot, where M>M'. Or, for example, a long PUCCH (or referred to a first type of PUCCH) refers to a PUCCH that consists of at least M (M is a positive integer, configured by higher layer signaling or preset by a protocol. For example, M is equal to 4) OFDM symbols, and a short PUCCH (or referred to as a second type of PUCCH) refers to a PUCCH that consists of at most M'(M' is a positive integer, configured by higher layer signaling or preset by a protocol. For example, M' is equal to 2) OFDM symbols, where M>M'.

In this case, when a PDSCH or PDCCH that generates HARQ-ACK information is a short resource, if the HARQ-ACK is transmitted on a long PUCCH, then the value of $k_i$ is a positive integer larger than or equal to 1. That is, the HARQ-ACK must be transmitted in a time slot next to a time slot of the PDSCH or PDCCH that generates the HARQ-ACK information. If the HARQ-ACK is transmitted in a short PUCCH, then the value of $k_i$ is a positive integer larger than or equal to 0. That is, the HARQ-ACK may be transmitted in the same time slot as the PDSCH or PDCCH that generates the HARQ-ACK information. Thus, it can be seen that $k_i$ which indicates the HARQ-ACK timing may vary as the length of the PUCCH that transmits the HARQ-ACK varies. For example, if the HARQ-ACK is transmitted in a long PUCCH, $k_i$ belongs to a set K1 including elements {k$_1$, k$_2$, k$_3$, k$_4$}; and if the HARQ-ACK is transmitted in a short PUCCH, then k$_i$ belongs to a set K2 including elements {k$_5$, k$_6$, k$_7$, k$_8$}, where the set K1 and the set K2 may be the same set, or may be independent sets. If the length of the PUCCH that transmits the HARQ-ACK is dynamically changing, then the set of k$_i$ varies as it varies. Corresponding to the processing in Embodiment 1, the set of k$_i$ configured may be two, and the actual values of k$_i$ may be determined by selecting a corresponding set according to the length of the PUCCH. Same processing applies to k$_i'$.

Embodiment 2

In the present embodiment, time units (i.e., time units of k, k$_i$ and k$_i'$) in timings between a dynamically scheduled PDSCH, a SPS PDSCH and a PDCCH that indicates SPS releasing and HARQ will be described. Since in different serving cells and at different moments in a same serving cell, the lengths of time slots may be different, therefore, no matter whether a HARQ timing is configured by higher layer signaling, or dynamically indicated by physical layer signaling, a time unit length needs to be determined.

If the time slot length A of a serving cell that transmits HARQ-ACK is not changing, the time slot length B of a serving cell of a PDSCH or PDCCH that indicates SPS releasing that generates the HARQ-ACK is not changing, and the time slot length B of the serving cell of the PDSCH or PDCCH that indicates SPS releasing that generates the HARQ-ACK and the time slot length A of the serving cell that transmits the HARQ-ACK are same, as shown in FIG. 9, then the time unit indicated by the timing is the time slot length A of the serving cell that transmits the HARQ-ACK. For example, the PDSCH or PDCCH that indicates SPS releasing that generates the HARQ-ACK is transmitted in a time slot n, then the HARQ-ACK of the PDSCH or PDCCH that indicates SPS releasing that generates the HARQ-ACK is transmitted in a time slot n+k.

If the time slot length A of a serving cell that transmits HARQ-ACK is not changing, the time slot length B of a serving cell of a PDSCH or PDCCH that indicates SPS releasing that generates the HARQ-ACK is not changing, and the time slot length B of the serving cell of the PDSCH or PDCCH that indicates SPS releasing that generates the HARQ-ACK is larger than the time slot length A of the serving cell that transmits the HARQ-ACK, then the time unit indicated by the timing is the time slot length B of the serving cell of the PDSCH or PDCCH that indicates SPS releasing that generates the HARQ-ACK. In the following, the HARQ-ACK is transmitted in which time slot will be described in detail. Assuming that the PDSCH or PDCCH that indicates SPS releasing that generates the HARQ-ACK is transmitted in a time slot m (the length of the time slot m is the time slot length B of the serving cell where the PDSCH or the PDCCH that indicates SPS releasing that generates the HARQ-ACK is located), then time slots of the serving cell that transmit the HARQ-ACK and that overlap with the time slot m are time slots n, . . . , n+L−1, then the HARQ-ACK of the PDSCH or PDCCH that indicates SPS releasing is transmitted in a time slot out of L time slots within overlapped time slots p, . . . , p+L−1, overlapped with a time slot m+k' (being transmitted in which time slot of the L time slots is determined according to a protocol), where k' is indicated by higher layer signaling or physical layer signaling (e.g., k, k$_i$, and k$_i'$ are indicated by higher layer signaling or DCI as introduced in Embodiment 1), and the time unit of k' is the time slot length B of the serving cell where the PDSCH or the PDCCH that indicates SPS releasing that generates the HARQ-ACK is located, as shown in FIG. 10.

If the time slot length A of the serving cell that transmits the HARQ-ACK is not changing, the time slot length B of the serving cell of the PDSCH or PDCCH that indicates SPS releasing that generates the HARQ-ACK is not changing, and if the time slot length B of the serving cell of the PDSCH or PDCCH that indicates SPS releasing that generates the HARQ-ACK is larger than the time slot length A of the serving cell that transmits the HARQ-ACK, then the time unit indicated by the timing is the time slot length A of the serving cell that transmits the HARQ-ACK. In the following, the HARQ-ACK is transmitted in which time slot will be described in detail. Assuming that the PDSCH or the PDCCH that indicates SPS releasing that generates the HARQ-ACK is transmitted in the time slot m (the time slot length is the time slot length B of the serving cell where the PDSCH or the PDCCH that indicates SPS releasing that generates the HARQ-ACK is located), then time slots of the serving cell that transmit the HARQ-ACK and that overlap with the time slot m are time slots n, . . . , n+L−1 (the time slot n is the first time slot that overlaps with the time slot m), then the HARQ-ACK of the PDSCH or PDCCH that indicates SPS releasing is transmitted in a time slot n+l+k'(l is a positive integer larger than or equal to 0 and is smaller than or equal to L, l is determined according to a protocol), where k is configured by higher layer signaling or indicated by physical layer signaling (e.g., k, k$_i$, and k$_i'$ are indicated by higher layer signaling or DCI as introduced in Embodiment 1), and the time unit of k' is the time slot length A of the serving cell that transmits the HARQ-ACK, as shown in FIG. 11.

If the time slot length A of the serving cell that transmits the HARQ-ACK is not changing, the time slot length B of the serving cell of the PDSCH or PDCCH that indicates SPS releasing that generates the HARQ-ACK is not changing, and if the time slot length B of the serving cell of the PDSCH or PDCCH that indicates SPS releasing that generates the HARQ-ACK is smaller than the time length A of the serving cell that transmits the HARQ-ACK, then the time unit indicated by the timing is the time slot length A of the serving cell that transmits the HARQ-ACK. In the following, the HARQ-ACK is transmitted in which time slot will be described in detail. Assuming that the PDSCH or the PDCCH that indicates SPS releasing that generates the HARQ-ACK is transmitted in the time slot m (the length of the time slot m is the time slot length B of the serving cell where the PDSCH or the PDCCH that indicates SPS releasing that generates the HARQ-ACK is located), and a time slot of the serving cell that transmits the HARQ-ACK and that overlaps with the time slot m is a time slot n, then the HARQ-ACK of the PDSCH or PDCCH that indicates SPS releasing is transmitted in a time slot n+k', where k' is indicated by higher layer signaling or physical layer signaling (e.g., k, k$_i$ and k$_i'$ are indicated by higher layer signaling or DCI as introduced in Embodiment 1), and the time unit of k' is the time slot length A of the serving cell that transmits the HARQ-ACK, as shown in FIG. 12.

In the foregoing two embodiments, the methods for determining the timings of HARQ-ACK in UCI are described in detail, and in the following, Embodiment 3 describes methods for transmitting respective relevant information in UCI on a PUCCH or on a PUSCH.

Embodiment 3

In the present embodiment, methods for transmitting UCI that consists of HARQ-ACK/SR and CSI on a PUCCH or PUSCH are described.

Situation 1: when the time slot length of a PUCCH that transmits UCI configured for a UE is the same with the time slot length of a PUSCH that transmits data, the following methods are used.

When the UE is configured to be allowed to transmit a PUCCH and a PUSCH at the same time, at least transmit one PUSCH, and only have periodic CSI to transmit, the UE transmits the periodic CSI on a PUCCH; and when the UE is configured to be allowed to transmit a PUCCH and a PUSCH at the same time, at least transmit one PUSCH, and only have HARQ-ACK/SR to transmit, the UE transmits the HARQ-ACK/SR on a PUCCH; when the UE is configured to be allowed to transmit a PUCCH and a PUSCH at the same time, at least transmit one PUSCH, and have periodic CSI and HARQ-ACK to transmit at the same time, the UE transmits the HARQ-ACK on a PUCCH, and transmits the periodic CSI on a PUSCH of a serving cell that has the smallest serving cell number; and when the UE is configured to be allowed to transmit a PUCCH and a PUSCH at the same time, and have no PUSCH transmission, then the UE transmits periodic CSI and/or HARQ-ACK/SR on a PUCCH.

When the UE is configured to forbid transmitting a PUCCH and a PUSCH at the same time, and at least transmit one PUSCH, the UE transmits periodic CSI and/or HARQ-ACK/SR on a PUSCH of a serving cell that has the smallest serving cell number; and when the UE is configured to forbid transmitting a PUCCH and a PUSCH at the same time, and have no PUSCH transmission, the UE transmits periodic CSI and/or HARQ-ACK/SR on a PUCCH.

Situation 2: when the time slot length of at least one PUSCH scheduled for transmitting data is smaller than the time slot length of a PUCCH that transmits UCI configured for the UE, the following method are used.

Method 1:

When a PUSCH that has a time slot length which is the same with that of a PUCCH that transmits UCI is scheduled, and the UE determines to transmit the UCI on the PUSCH according to the number of a serving cell ID, the UE processes this case according to the methods in Situation 1.

When only a PUSCH that has a time slot length shorter than that of a PUCCH that transmits UCI is scheduled, or when the UE determines to transmit the UCI is on a short PUSCH according to the number of a serving cell ID, then the UE only transmits UCI on the PUCCH.

Method 2:

When a PUSCH that has a time slot length which is the same with that of a PUCCH that transmits UCI is scheduled, and the UE determines to transmit the UCI on the PUSCH according to the number of a serving cell ID, the UE processes this case according to the methods in Situation 1.

When only a PUSCH that has a time slot shorter than that of a PUCCH that transmits UCI is scheduled, or, the UE determines to transmit UCI on a short PUSCH according to the number of a serving cell ID, and if DCI that schedules the PUSCH is before the PUCCH and has an interval larger than or equal to t1 (t1 is larger than or equal to 0) and smaller than t2 (t2 is larger than t1) with the PUCCH, as shown in FIG. 13, then no matter whether the UE is configured to be allowed to transmit a PUCCH and a PUSCH at the same time, or forbid transmitting a PUCCH and a PUSCH at the same time, the UE transmits all UCI on short PUSCHs, as in this case, the UE does not have enough time to jointly code CSI and HARQ-ACK/SR or only code CSI according to whether there is a short PUSCH transmission.

When only a PUSCH that has a time slot length shorter than that of a PUCCH that transmits UCI is scheduled, or the UE determines to transmit UCI on a short PUSCH according to the number of a serving cell ID, and if DCI that schedules the PUSCH is before starting a PUCCH transmission, and has an interval smaller than t1 (t1 is larger than or equal to 0) with the PUCCH, or if the DCI that schedules the PUSCH is transmitted after the PUCCH transmission starts, as shown in FIG. 14, no matter whether the UE is configured to be allowed to transmit a PUCCH and a PUSCH at the same time, or the UE is configured to forbid transmitting a PUCCH and a PUSCH at the same time, the UE transmits all UCI on the PUCCH, as in this case, the UE has started to transmit UCI on the PUCCH before it receives DCI.

The foregoing is the implementation of the method for transmitting UCI according to the present disclosure. Through the foregoing processing, the method can simply and conveniently determine the HARQ-ACK timing, can transmit HARQ-ACK in time, and further can effectively transmit UCI information.

Embodiment 4

The present embodiment describes a timing between a PDCCH that activates a SPS PDSCH and a PDSCH and a timing between a PDCCH that activates SPS PUSCH and a PUSCH.

First, the timing between a PDCCH that activates a SPS PDSCH and a PDSCH will be described. If a PDCCH that activates a SPS PDSCH is transmits in a time slot n–k, then the first SPS PDSCH is transmitted in a time slot n. The value of k may be preset by a protocol, e.g., k=0; the value of k may be configured by higher layer signaling; the value of k may be jointly configured by higher layer signaling and indicated by physical layer signaling, i.e., the higher layer signaling configuring m possible values of k, and a bit/bits on the PDCCH that activates the SPS PDSCH indicating one of the m possible values of k; the value of k may be the same with a value of k received between the PDCCH and the PDSCH in a common search space. Except for the first SPS PDSCH, the other SPS PDSCHs are transmitted periodically starting with the first PDSCH, until SPS is released. The higher layer signaling configuration of the SPS PDSCH or the possible values of k and the configuration of the dynamically scheduled PDSCH or the possible values of k may be performed uniformly or separately.

First, the timing between a PDCCH that activates a SPS PUSCH and the PUSCH will be described. If a PDCCH that activates a SPS PUSCH is transmitted in a time slot n–k, then the first SPS PUSCH is transmitted in a time slot n. The value of k may be preset by a protocol, e.g., k=4; the value of k may be configured by higher layer signaling; the value of k may be jointly configured by higher layer signaling and indicated by physical layer signaling, i.e., the higher layer signaling configuring m possible values of k, and a bit/bits on the PDCCH that activates the SPS PUSCH indicating one of the m possible values of k; the value of k may be the same with a value of k received between the PDCCH and the PUSCH in a common search space. Except the first SPS PUSCH, the other SPS PUSCHs are transmitted periodically starting with the first PUSCH, until SPS is released. The higher layer signaling configuration of the SPS PUSCH or the preset possible values of k and the configuration of the dynamically scheduled PUSCH or the preset possible values of k may be performed uniformly or separately.

Embodiment 5

In the present embodiment, time units (i.e., time units of k, $k_i$ and $k_i'$) in timings between a dynamically scheduled PDSCH, a SPS PDSCH and a PDCCH that indicates SPS releasing and HARQ will be described. Since in different serving cells and at different moments in a same serving cell, the lengths of time slots may be different, therefore, no matter whether a HARQ timing is configured by higher layer signaling, or dynamically indicated by physical layer signaling, or configured by higher layer and dynamically indicated by physical layer signaling, it is necessary to determine the length of a time unit, and the time unit indicated by the timing may be a time slot length A of a serving cell that transmits HARQ-ACK.

Assuming that a PDSCH or a PDCCH that indicates SPS releasing that generates HARQ-ACK is transmitted in a time slot m (the time slot length of the time slot m is a time slot length B of a serving cell where the PDSCH or the PDCCH that indicates SPS releasing that generates the HARQ-ACK is located), and that a time slot of a serving cell for transmitting HARQ-ACK that overlaps with the last OFDM symbol for transmitting the PDSCH or the PDCCH that indicates SPS releasing in the time slot m in the time aspect is a time slot n, then the HARQ-ACK of the PDSCH or the PDCCH that indicates SPS releasing is transmitted in a time slot n+k, i.e., the time slot for transmitting the HARQ-ACK being counted starting from the time slot n. K is a timing indicated through physical layer signaling (DCI), as shown in FIG. 15.

Assuming that a PDSCH or a PDCCH that indicates SPS releasing that generates HARQ-ACK is transmitted in a time slot m (the time slot length of the time slot m is a time slot length B of a serving cell where the PDSCH or the PDCCH that indicates SPS releasing that generates the HARQ-ACK is located), and that time slots of a serving cell for transmitting HARQ-ACK that overlap with the last OFDM symbol for transmitting the PDSCH or the PDCCH that indicates SPS releasing in the time slot m in the time aspect are time slots n and n+l, then the HARQ-ACK of the PDSCH or the PDCCH that indicates SPS releasing is transmitted in the time slot n+k, i.e., the time slot that transmits HARQ-ACK being counted starting from the time slot n; or the HARQ-ACK of the PDSCH or the PDCCH that indicates SPS releasing is transmitted in a time slot n+l+k, i.e., the time slot for transmitting the HARQ-ACK being counted starting from the time slot n+l, and whether the time slot for transmitting the HARQ-ACK is counted starting from the time slot n or starting from the time slot n+l is preconfigured according to a protocol, to prevent inconsistent understanding between the base station and the UEs. K is a timing indicated according to physical layer signaling (DCI), as shown in FIG. 16.

The present disclosure further provides an apparatus for transmitting UCI, used to implement the foregoing transmission methods. FIG. 17 is a schematic diagram of a basic structure of an apparatus for transmitting UCI according to the present disclosure. As shown in FIG. 17, the apparatus includes: a timing determination unit and a transmission unit.

The timing determination unit is to determine a HARQ timing or HARQ timings of a dynamically scheduled PDSCH, a SPS PDSCH and/or a PDCCH that indicates SPS releasing according to information sent from a base station. The transmission unit is to transmit generated HARQ-ACK information according to the HARQ timing or the HARQ timings determined by the timing determination unit.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a user equipment (UE), the method comprising:
receiving, from a base station, a physical downlink control channel (PDCCH) carrying downlink control information (DCI) including k value and a physical downlink shared channel (PDSCH), wherein the reception of the PDCCH or the PDSCH ends in an $n^{th}$ slot; and
transmitting, to the base station, a physical uplink control channel (PUCCH) including hybrid automatic retransmission request acknowledgement (HARQ-ACK) information in $(n+k)^{th}$ slot,
wherein a time unit of k is a slot length of the PUCCH, wherein, in case a slot length of the PDSCH is less than a slot length of the PUCCH, transmitting the PUCCH in the $(n+k)^{th}$ slot comprises transmitting the PUCCH after a $k^{th}$ slot from an $n^{th}$ slot of the PUCCH that overlaps with a slot in which the PDSCH is received.

2. The method of claim 1, wherein, in case a slot length of the PDSCH is larger than a slot length of the PUCCH, transmitting the PUCCH in the $(n+k)^{th}$ slot comprises transmitting the PUCCH after $(k)^{th}$ slot from an $n^{th}$ slot of the PUCCH that ends at a same time as a slot in which the PDSCH is received.

3. The method of claim 1, wherein, in case the PDSCH is semi persistent scheduled (SPS), the DCI indicates SPS releasing, and a slot length of the PDCCH is less than a slot length of the PUCCH, transmitting the PUCCH in the $(n+k)^{th}$ slot comprises transmitting the PUCCH after $(k)^{th}$ slot from an $n^{th}$ slot of the PUCCH that overlaps with a slot in which the PDCCH is received.

4. The method of claim 1, wherein, if the PDSCH is semi persistent scheduled (SPS), the DCI indicates SPS releasing, and a slot length of the PDCCH is larger than a slot length of the PUCCH, transmitting the PUCCH in the $(n+k)^{th}$ slot comprises transmitting the PUCCH after $(k)^{th}$ slot from an $(n)^{th}$ slot of the PUCCH that ends at same time as a slot in which the PDCCH is received.

5. The method of claim 1, wherein, in case the PDSCH is semi persistent scheduled (SPS) and the DCI indicates SPS activation, transmitting the PUCCH in the $(n+k)^{th}$ slot comprises transmitting the PUCCH after $(k)^{th}$ slot from an $n^{th}$ slot in which the reception of the PDSCH ends.

6. An apparatus of a user equipment (UE) in a wireless communication system, the apparatus comprising:
at least one transceiver; and
at least one processor operably coupled to the at least one transceiver and configured to:
receive, from a base station, a physical downlink control channel (PDCCH) carrying downlink control information (DCI) including k value and a physical downlink shared channel (PDSCH), wherein the reception of the PDCCH or the PDSCH ends in an $n^{th}$ slot; and
transmit, to the base station, a physical uplink control channel (PUCCH) including hybrid automatic retransmission request acknowledgement (HARQ-ACK) information in a $(n+k)^{th}$ slot,
wherein a time unit of k is a slot length of the PUCCH,
wherein, in case a slot length of the PDSCH is less than a slot length of the PUCCH, to transmit the PUCCH in the $(n+k)^{th}$ slot, the at least one processor is configured to transmit the PUCCH after a $k^{th}$ slot from an $n^{th}$ slot of the PUCCH that overlaps with a slot in which the PDSCH is received.

7. The apparatus of claim 6, wherein, in case a slot length of the PDSCH is larger than a slot length of the PUCCH, to transmit the PUCCH in the $(n+k)^{th}$ slot, the at least one processor is configured to transmit the PUCCH after a $k^{th}$ slot from an $n^{th}$ slot of the PUCCH that ends at a same time as a slot in which the PDSCH is received.

8. The apparatus of claim 6, wherein, in case the PDSCH is semi persistent scheduled (SPS), the DCI indicates SPS releasing, and a slot length of the PDCCH is less than a slot length of the PUCCH, to transmit the PUCCH in the $(n+k)^{th}$ slot, the at least one processor is configured to transmit the PUCCH after a $k^{th}$ slot from an $n^{th}$ slot of the PDCCH that overlaps with a slot in which the PDCCH is received.

9. The apparatus of claim 6, wherein, in case the PDSCH is semi persistent scheduled (SPS), the DCI indicates SPS releasing, and a slot length of the PDCCH is larger than a slot length of the PUCCH, to transmit the PUCCH in the $(n+k)^{th}$ slot, the at least one processor is configured to transmit the PUCCH after a $k^{th}$ slot from an $n^{th}$ of the PUCCH ends at same time as a slot in which the PDCCH is received.

10. The apparatus of claim 6, wherein, in case the PDSCH is semi persistent scheduled (SPS) and the DCI indicates SPS activation, to transmit the PUCCH in the $(n+k)^{th}$ slot, the at least one processor is configured to transmit the PUCCH after a $k^{th}$ slot from a $n^{th}$ slot in which the reception of the PDSCH ends.

* * * * *